United States Patent [19]

Bruch

[11] Patent Number: 4,648,630

[45] Date of Patent: Mar. 10, 1987

[54] FIRE HOSE COUPLING LOCK

[75] Inventor: George H. Bruch, Thurston County, Wash.

[73] Assignee: David A. Zornes, Tacoma, Wash.

[21] Appl. No.: 750,888

[22] Filed: Jul. 1, 1985

Related U.S. Application Data

[63] Continuation-in-part of Ser. No. 467,028, Feb. 16, 1983, abandoned.

[51] Int. Cl.4 ............................................. F16L 15/00
[52] U.S. Cl. ........................................ 285/87; 285/92
[58] Field of Search ................. 285/87, 72, 320, 76, 285/79, 92; 403/338, 335, 336

[56] References Cited

U.S. PATENT DOCUMENTS

| | | | |
|---|---|---|---|
| 708,104 | 9/1902 | Warner | 285/87 |
| 726,077 | 4/1903 | Lehotzky | 285/87 |
| 734,414 | 7/1903 | Freeman | 285/320 X |
| 1,080,675 | 12/1913 | Berg | 285/87 |
| 1,200,266 | 10/1916 | Strausser | 285/87 |
| 1,858,992 | 5/1932 | Hansen | 285/87 |
| 2,277,399 | 3/1942 | Groff | 285/320 X |
| 3,153,548 | 10/1964 | Speakman et al. | 285/87 |
| 3,807,774 | 4/1974 | Heath | 285/87 |

Primary Examiner—Dave W. Arola
Attorney, Agent, or Firm—Seed and Berry

[57] ABSTRACT

A fire hose coupling locking device is disclosed which effectively secures a twist-type, high-pressure, quick-connect fire hose coupling from twisting loose when pressure is applied. Typically, it is permanently attached to a friction knob or lug at the top of a collar on the high-pressure outlet side on the fire pumper. It is pivotable about the lug and of sufficient length to span the coupling faces of the high-pressure outlet side to the fire hose and to engage of engaging the friction knob or lug on the top of the collar on the fire hose. Any relative rotation of the collars when water under high pressure is initially forced through the coupling is prevented.

6 Claims, 3 Drawing Figures

FIRE HOSE COUPLING LOCK

CROSS-REFERENCE TO RELATED APPLICATION

This application is a continuation-in-part of Ser. No. 6/467,028, filed Feb. 16, 1983 now abandoned.

TECHNICAL FIELD

This invention relates to means for preventing high-pressure, quick-connect, twist-type hose couplings from twisting loose. In particular, this invention relates to a locking mechanism which can be installed on most presently existing fire hose connections in the field, which mechanism prevents coupling elements from rotating relative to each other.

BACKGROUND ART

Fire fighting often requires laying down and connecting long lengths of heavy hose capable of withstanding high pressure. Hose today is typically connected by means of quick, twist-type connectors. Many commercially available couplings require only turning a mated pair of coupling faces together to achieve a watertight joint. The coupling faces rotate about each hose end so that hose need not be turned to get proper alignment. The coupling face fittings are rotated to get proper alignment of locking lugs of the two coupling faces to be joined. The hoses are then pulled into abutting relationship and one coupling face is rotated relative to the other until the connecting lugs engage, forming a tight joint between the hose sections.

For many couplings, only a quarter or one-third turn of a coupling face is required to achieve a watertight connection. The coupling faces are often provided with protruding lugs for receiving a wrench end to tighten up the fitting. These lugs may be arranged so that when a seal is achieved, the lugs across the two coupling faces line up longitudinally with respect to hose direction. This feature is especially valuable for ensuring that the joint is fully engaged, particularly in view of the often difficult, low-visibility conditions under which fire fighters work.

While the present day quick-connect, twist-to-seal couplings save a great deal of time and effort, a safety problem has developed. As fire hose is removed from a fire truck, random direction kinks or twists in the hose are often created. It is generally impossible to prevent these kinks in laying the hose, particularly when long lengths of up to 600 feet of 5-inch line are not unusual. The end of a hose run from the fire location is connected to a stationary object, such as a pumper truck, heavy distribution manifold, or fire hydrant. The twists in the hose become a problem when the fire hose is pressurized. As air is displaced through the filling hose, the kinks cause the hose to turn in the direction of the kinks. The turning or twisting motion is imparted to the hose with such force that the hand- or wrench-tightened twist couplings may twist loose. The problem is particularly acute where the hose is fastened to a stationary object whose one coupling face is substantially fixed with respect to the other coupling face. The twisting motion imparted by the hose kinks and filling action can rotate the relatively less fixed coupling face, causing it to separate from the fixed coupling face. The rotating line blows off the stationary object or turns over a large manifold with great force, causing damage to fire fighters, bystanders, and property. Once the fittings are pressurized with water, the danger is over since the pressure in the line holds the fitting connecting mechanism tightly in place. At the initiation of pressurization, however, there are no such forces holding the connecting mechanism together and the coupling is easily defeated by the forces generated in bringing line pressure up to working pressure in combination with the random direction kinks.

The necessity of locking quick-connect, nonthreaded hose couplings together has been recognized to some degree in the prior art, as discussed below. However, prior art locking devices, most lightly because they did not have to deal with the larger diameter fire hose of today and the weights and pressures connected therewith, are insufficient to resist the uncoupling danger.

In addition, modern fire fighters have gone to great lengths to make sure hose coupling systems are independent of end-to-end orientation, or "unisex" in nature. That is, any hose length must be able to be connected to any other similar diameter hose or pumper truck or similar fixed connection. Many times during fighting fires, hose routings and connections must be changed. There is no time to turn hose lengths around to ensure proper coupling.

Present day coupling systems are also designed for speed, with connecting mechanisms that do not require turning hose lengths for special coupling alignments. As noted above, coupling faces rotate for alignment while the hose remains stationary.

Another factor in today's coupling systems is that they must be designed for ease and simplicity of operation. Fire fighters wear heavy protection clothing, and in general, find it difficult to operate couplings or couplings locks that require a great deal of digital dexterity.

The prior art locking mechanims are designed and adapted for couplings of the type requiring special end-to-end orientation. Most require special alignment in order to establish a connection. Many are complex and difficult to operate. A number of typical prior art locking mechanisms are described in the following paragraphs.

Lehotzky, in U.S. Pat. No. 726,077, discloses a quick-disconnect fire hose coupling utilizing a latch and turn-key combination to restrict relative longitudinal displacement of the couplings. The Lehotzky patent does not provide a positive means of preventing relative rotational displacement of the coupling faces, which is absolutely necessary in the face of modern high-pressure fire-fighting pumps. In addition, the Lehotzky latch is limited and integral to the Lehotzky hose coupling and is not adaptable to twist-type, high-pressure, quick-connect couplings currently being utilized in the field.

Berg, in U.S. Pat. No. 1,080,675, discloses a threadless hose coupling incorporating an internal locking ring rotated by an external handle which is stowed in grooves provided in the female end of the the coupling. The Berg patent has a plurality of moving parts and is not adaptable to modern fire-fighting, high-pressure, quick-connect hose fittings.

Strausser, in U.S. Pat. No. 1,200,266, discloses a threadless hose coupling which relies on primary and auxiliary locking dogs as the sole means of coupling two hoses. Thus the locking means is extremely heavy and has a plurality of moving parts, both internally and externally. The Strausser invention requires specially designed hose ends, incorporating its coupling, which are not used in modern fire-fighting systems. There is also no provision in the Strausser patent to restrict relative rotation between the sides of the coupling other than by pure force and friction, which generate fatigue failures of the system.

Hansen, in U.S. Pat. No. 1,858,992, discloses a hose coupling equipped with spring-actuated yokes. The Hansen invention is not adaptable to existing quarter-turn, high-pressure, quick-connect fire hose couplings and relies on spring tension to maintain its yokes in place.

Heath, in U.S. Pat. No. 3,807,774, discloses a locking device to prevent a tube fitting from rotating, comprising an external face on the female side of the fitting equipped with continuous serrations around its circumference and a wire threaded through a hole in an external nut on the face of the male side of the fitting perpendicular to the longitudinal axis of the fitting so as to engage the serrations when the wire is rotated within the hole in the external nut. The Heath device is too flimsy and requires a special coupling design. Both of these deficiencies make it impractical for quater-turn, high-pressure, quick-connect fire hose couplings.

DISCLOSURE OF INVENTION

It is a primary object of the invention to provide a locking means that will prevent accidental rotational forces from disengaging a pair of quick-connect, twist-to-join coupling faces, particularly during line pressurization.

It is a primary object of the invention to provide an inexpensive, simple locking mechanism that can readily be added to conventional quarter-turn, high-pressure, quick-connect fire hose couplings. The lock of the invention eliminates risk to the safety of fire fighters and bystanders from a twisted hose rotating in relation to a high-pressure outlet side when pressure is applied, with the resultant disconnection of the high-pressure coupling. The lock does not significantly increase the time or manpower required to connect or disconnect the coupling.

An additional object of the invention is to provide a locking mechanism which does not require special end-to-end orientation of hose. That is, the lock does not interfere with the unisex nature of coupling faces which is necessary to avoid having to turn hose ends around to affect or change connections.

It is also an object to provide a mechanism which can be engaged simply and positively. A person making the coupling connection may engage the lock without any alignment other than just making a complete twist coupling. The lock may be engaged by feel with one hand.

A key to the utility of the Bruch invention is that it is inexpensive to manufacture and install on existing fire hose couplings. It may be made of materials compatible with hose couplings to minimize corrosion and has no internal moving parts.

In summary, the invention is a locking means for preventing accidental releasing rotations of one conduit with respect to another when the conduits are joined together with a quick-twist coupling means. The coupling, when both coupling faces are twisted together, forms a continuous annular ridge about the joint between the two conduits or hoses. The locking means requires a mounting lug fixed to the exterior surface of one coupling face. A locking bar is pivotably mounted on the lug and is of sufficient length to extend to the outer edge of the annular ridge formed by the opposite coupling face. The locking means opposite its pivoted end has a means for gripping the outer annular coupling edge and urging the coupling together. The gripping mechanism exerts sufficient force in urging the coupling together that, during pressurization of the conduits or hose, rotation of one coupling face with respect to the other is prevented.

A preferred fire hose coupling locking device of the invention is designed to be fitted to existing one-fifth to quarter-turn, high-pressure, quick-connect fire hose couplings of the widely used Storz type. The device of the invention, which is suitable to achieve the foregoing objectives, comprises a one-piece locking bar pivotably attached to a top friction knob or wrench lug on the collar on a high-pressure outlet side of a coupling. The bar, when rotated downward, spans the longitudinal width of the coupling and engages the top friction knob or lug on the collar on the inlet side of the coupling, thereby maintaining the relationship of both sides of the coupling. The bar includes a hood element similar in shape and size to the friction knob or lug which frictionally engages the lug with sufficient force to resist and prevent twisting forces which may be generated during hose pressurization. The hood remains engaged until rotated upward by manual means.

BEST MODE FOR CARRYING OUT THE INVENTION

This invention relates generally to an article of manufacture for maintaining the rotational relationship between both sides of a twist-turn, high-pressure, quick-connect fire hose coupling without increasing the time or manpower required to connect or disconnect the coupling, said article being capable of installation on couplings widely in commercial service. The objects of this invention are accomplished and will become apparent from the following detailed description taken in conjunction with the accompanying drawings.

Figure 1:
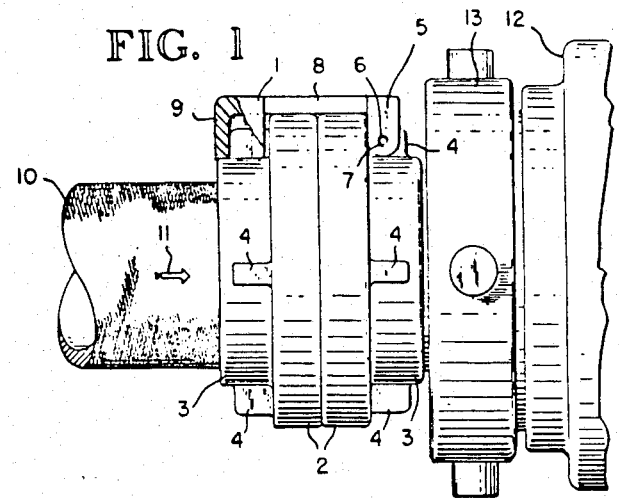
FIG. 1 depicts a twist-type, high-pressure, quick-connect fire hose coupling with the lock engaged.

Referring to FIG. 1, a fire hose coupling lock 1 is shown in the engaged or locked position, installed on a standard quarter-turn, high-pressure, quick-connect fire hose coupling of the Storz type, connecting a fire hose 10 to a pumper truck 12 through inlet 13. Arrow 11 indicates the direction of flow through the coupling. The coupling comprises a coupling face 2 and a locking collar 3 which are rotationally fixed together. Initially, the coupling face 2 and collar 3 are free in rotation with respect to the hose 10 and truck fitting 13. However, when the coupling is engaged as shown and water pressure is applied through the coupling, the coupling faces 2 and collars 3 become fixed in relation to each other. The collars 3 are equipped with friction knobs or locking lugs 4 at 90-degree increments about its circumference. The lugs 4 are designed to receive a wrench end to assist in tightening the coupling. When the coupling is fully engaged, the locking lugs 4 are in longitudinal alignment, demonstrating to the operator that a seal has been achieved.

Figure 3:
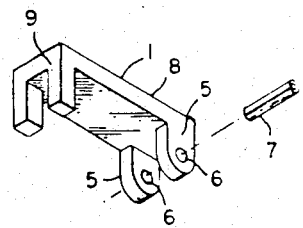
FIG. 3 depicts an alternative design of the locking hood which engages a friction knob or wrench lug on the collar on the outlet side of the coupling.

A fire hose coupling lock 1 is shown in detail in FIG. 3. Two opposing hinge flanges 5 are of sufficient distance apart to sit astride the friction knob 4 at the top of the collar 3 on the outlet side of the coupling 2. Holes 6 are aligned to correspond with a similar hole in the friction knob 4. A hinge pin 7 passes through one hinge flange 5, the friction knob 4, and the other hinge flange 5, thus maintaining a fixed horizontal and vertical relationship between them while allowing the fire hose coupling lock 1 to freely rotate around the hinge pin 7. A spanning bar 8 is of sufficient length to reach across the annular ridge established by the width of the couplings 2. A locking hood 9 extends down from the end of the spanning bar 8 a sufficient distance on both sides so as to frictionally engage the friction knob 4 on the top of the collar 3 on the inlet side of the coupling. The hood extends slightly beyond the end of the friction knob 4 and the collar 3 on the inlet side when the fire hose coupling lock 1 is engaged to enable easily lifting the locking hood 9 from friction knob 4 to allow disconnection of the coupling.

Figure 2:
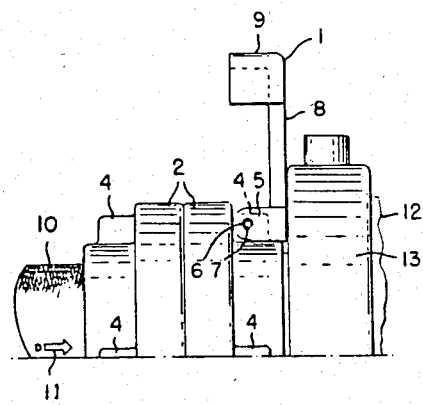
FIG. 2 depicts the coupling of FIG. 1 with the lock disengaged.

FIG. 2 depicts the fire hose coupling lock 1 in the unlocked position, having rotated 90 degrees on the hinge pin 7 so that the spanning bar 8 is perpendicular to the direction of flow 11, the locking hood 9 is displaced from the inlet collar 3 and friction knob 4, and the whole fire hose coupling lock 1 is out of the way to allow unencumbered separation of the coupling faces 2.

FIG. 3 depicts the fire hose coupling lock 1 with an alternative locking hood 9 having an open end for ease of manufacture.

FIG. 1 shows the locking device of the invention installed on the inlet side of a pumper truck fiting. In such a location, there is no problem with hose end-to-end orientation. The lock will engage any identical coupling face. Where there are no regular wrench lugs on the coupling collars to engage, installation of the device may require mounting a pivoting lug on a stationary device and an engagement lug on hose likely to be connected to the stationary equipment. In some cases, it is preferred to construct the bar 8 and engagement element 9 of a resilient material, such as spring steel, to frictionally engage the opposite outer perpendicular face of the annular ring established by the two coupling faces 2. In some installations, in the absence of lugs 4, a slot is cut into the opposite coupling outer face. The slot receives element 9. In each case, the hood or engagement element 9 engages the opposite coupling with sufficient force to hold the two coupling faces 2 together in longitudinal alignment to resist and prevent accidental rotational forces from twisting one coupling face relative to the other. The coupling device may be used to secure hose to hose connectors also. In such cases, a coupling lock at each end of the hose sections is necessary to preserve absolute unisex compatibility.

Although the invention has been described with reference to preferred embodiments, it will be appreciated by those skilled in the art that additions, deletions, modifications, substitutions, and other changes not specifically described may be made which will fall within the purview of the appended claims.

I claim:

1. A locking means for preventing accidental releasing rotation of one elongated conduit with respect to another elongated conduit, which conduits are joined together by coupling means of the type wherein the end of each conduit to be coupled is adapted to be coupled to a substantially identical conduit end when the two conduit ends are aligned and abutted to one another and rotated with respect to one another about the longitudinal axis of the conduits to form a water-tight joint between the two conduits, each conduit end including a coupling face on the projecting end thereof, and an annular portion adjoining the coupling face such that when two conduit ends are joined an annular ridge is formed by said annular portions, said locking means comprising:

a mounting means fixed to an exterior surface of one of said coupling faces; and a locking bar means, pivotably mounted on said mounting means, which bar extends across said joint to the outer edge of said annular ridge formed by the joining together of two coupling faces, said bar means including a means for gripping said outer edge and urging said coupling together, whereby said locking bar, when pivoted into secure contact with said outer edge, urges said coupling faces together with sufficient force so that during pressurization of said conduits, separation of one coupling face with respect to the other is prevented.

2. A lock for preventing accidental releasing rotation of a coupling means joining tubular conduits to be pressurized, said coupling means of the type including, coupling faces on the outer end of each conduit end to be joined, and a collar connected to the conduit, the coupling face and collar being free to rotate axially with respect to said conduit prior to complete pressurization of the conduit, wherein aligning, abutting, and twisting a pair of substantially identical coupling faces together joins said conduits together, forming a pressure-tight joint, said lock comprising:

joined coupled faces which form an annular ridge between said conduits, said coupling faces having at least one protrusion on each conduit coupling face exterior, whereby joining two conduits together results in said protrusions in longitudinal alignment with respect to said conduits; and a locking bar, pivotally fixed to one coupling face protrusion, which bar, when pivoted across the conduit joint formed by joining said coupling faces, spans said joint and contacts said protrusion on the opposite coupling face, said lock further having a gripping hood which engages such protrusion on the opposite coupling face with sufficient frictional forces, whereby, when joined conduits are pressurized, rotation of one coupling face with respect to the other and separation of coupling faces along a longitudinal axis of the joined conduits are prevented.

3. The lock of claim 2 wherein said coupling means comprises a locking collar fixed to said coupling face, said locking collar having a number of said protrusions equally spaced about its circumference, whereby coupling conduits together always results in alignment of said protrusions on the joined coupling faces and said locking bar is pivotably attached to one such protrusion on a coupling face pair.

4. The lock of claim 3 wherein said coupling means requires about one-quarter turn to establish a pressure-tight joint and each coupling face includes four protrusions.

5. The lock of claim 4 wherein said conduits are fire hose.

6. The lock of claim 4 wherein said conduits are fire hose and a stationary conduit.

* * * * *